Feb. 13, 1962    W. F. GOLDING    3,020,773
APPARATUS FOR CONVERTING RECIPROCATING
INTO INTERMITTENT MOTION
Filed March 23, 1960    3 Sheets-Sheet 1

Feb. 13, 1962 W. F. GOLDING 3,020,773
APPARATUS FOR CONVERTING RECIPROCATING
INTO INTERMITTENT MOTION
Filed March 23, 1960 3 Sheets-Sheet 3

United States Patent Office 3,020,773
Patented Feb. 13, 1962

3,020,773
APPARATUS FOR CONVERTING RECIPROCATING INTO INTERMITTENT MOTION
William Frank Golding, 28 Parry's Close,
Stoke Bishop, Bristol 9, England
Filed Mar. 23, 1960, Ser. No. 17,026
Claims priority, application Great Britain Mar. 25, 1959
10 Claims. (Cl. 74—138)

This invention relates to apparatus for converting reciprocating into intermittent motion and is applicable, inter alia, to sheet feeding means wherein conveyor chains provided with sheet gripping devices have to be driven with an intermittent motion.

According to this invention apparatus for converting reciprocating into intermittent motion comprises a reciprocable slide, a pair of drive sprockets mounted for free rotation on said slide, an endless chain trained over said sprockets, means for supporting said chain in a pair of loops each including a run extending from one of said drive sprockets towards a position beyond the position occupied by said one sprocket when the slide has reached one end of its stroke and a run extending from the other one of said drive sprockets towards a position beyond the position occupied by said other drive sprocket when the slide has reached the other end of its stroke, said supporting means being arranged for said runs of said loops to extend in a direction parallel to the direction of reciprocation of said slide, and locking means for locking said loops against travel alternately during the whole of the respective strokes of the slide, all whereby reciprocating movement of the slide is converted into intermittent movement of said loops.

As one of the loops is locked against travel it acts as a rack for the drive sprockets to roll thereon as the slide moves through one stroke and the rotation of the drive sprockets causes the other loop to travel. When said other loop is locked during the other stroke of the slide, said one loop travels. Thus reciprocation of the slide is converted into intermittent movement of the loops.

Figure 1:
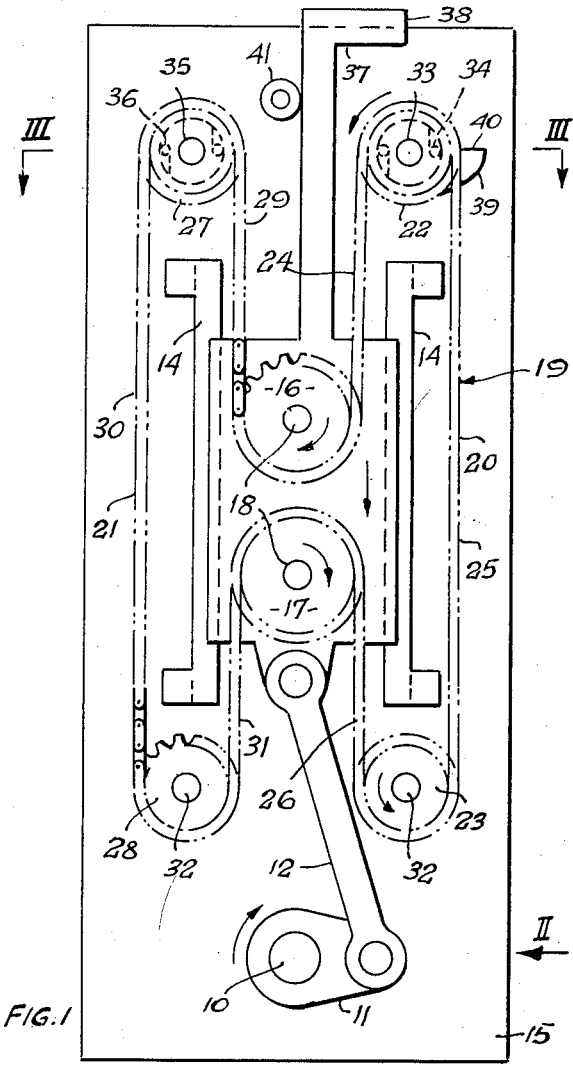
Figure 2:
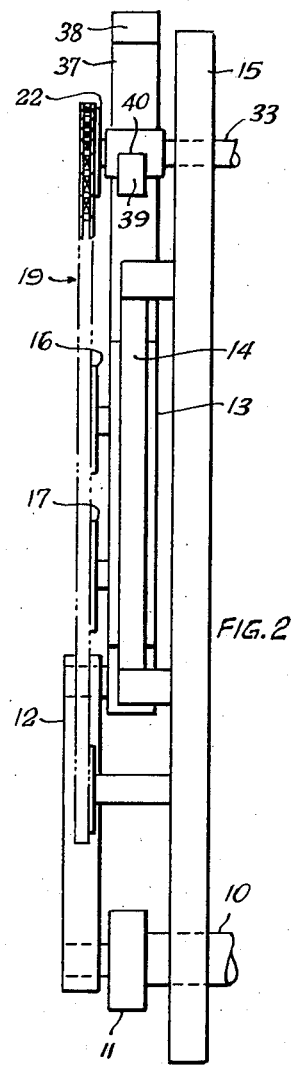
Figure 3:
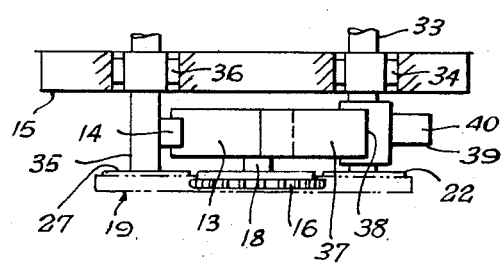
Figure 4:
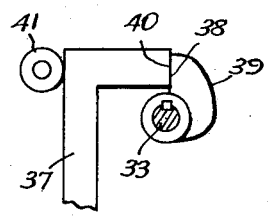
Figure 5:
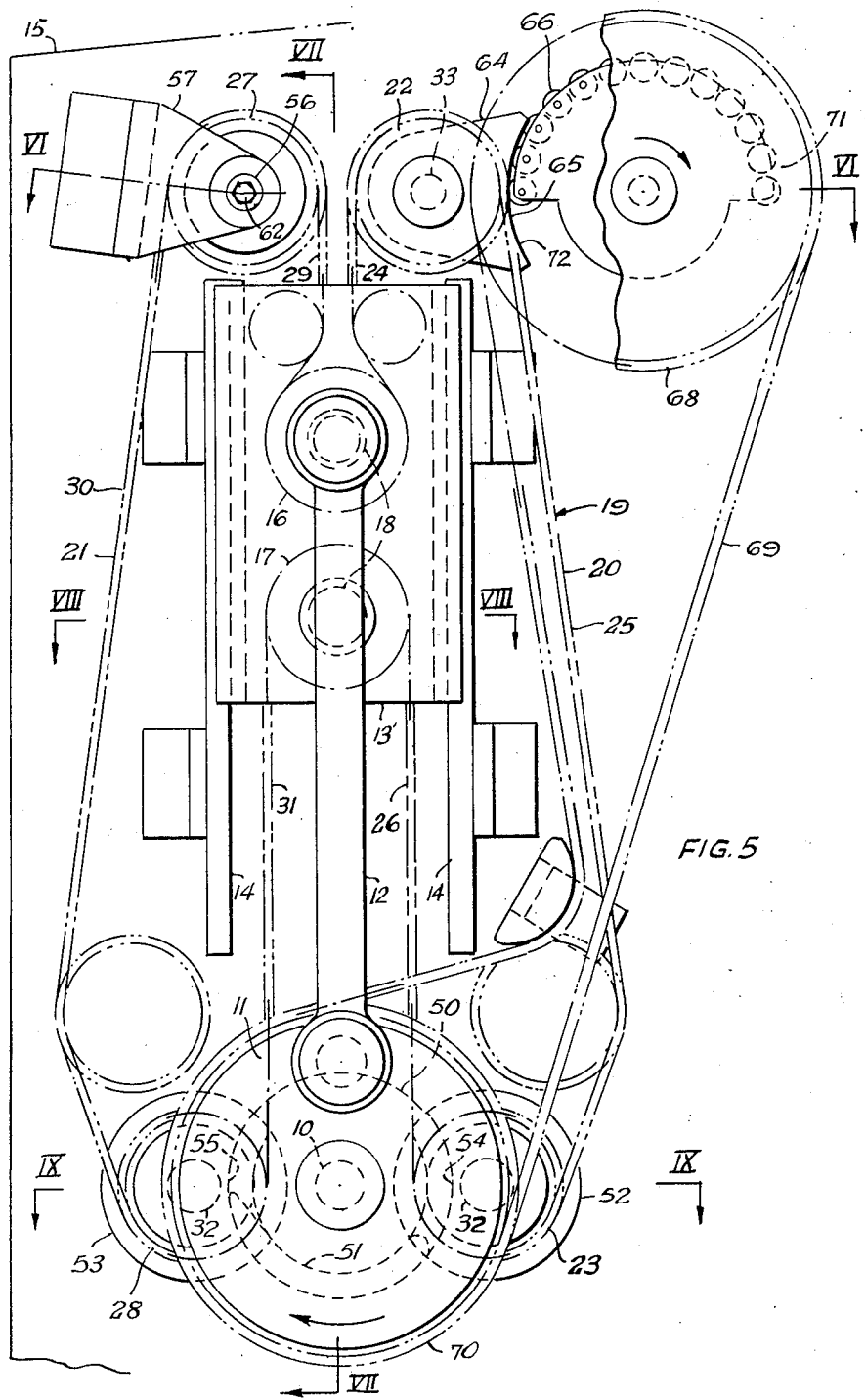
Figure 6:
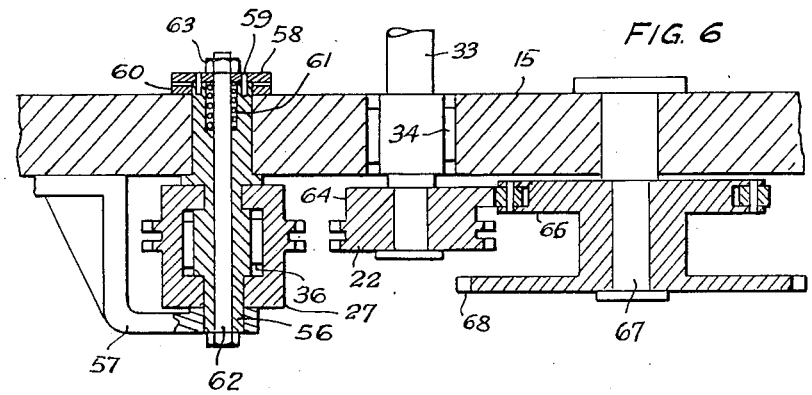
Figure 8:
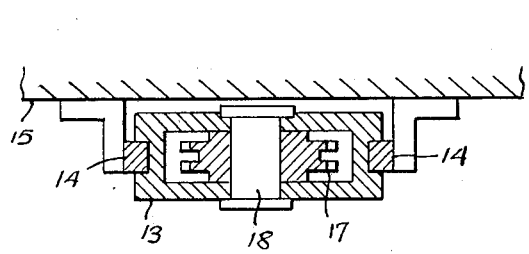
Figure 7:
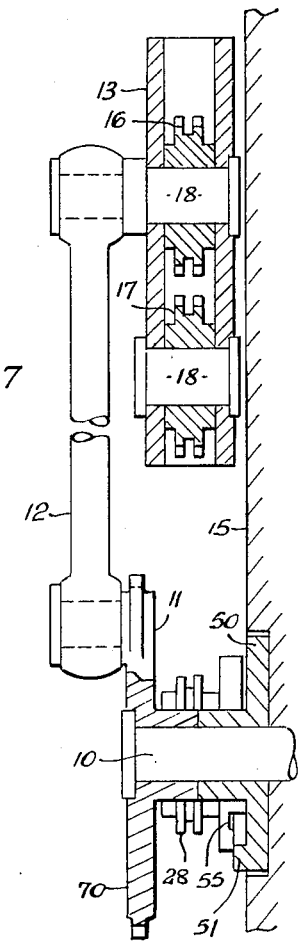
Figure 9:
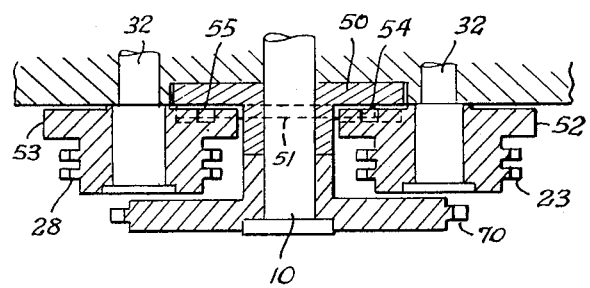

Constructional embodiments of the apparatus according to this invention will now be described with reference to the accompanying drawings wherein:

FIG. 1 is an elevation of a first embodiment.
FIG. 2 is a side view of FIG. 1 as seen in the direction of the arrow II.
FIG. 3 is a section on the line III—III in FIG. 1.
FIG. 4 is a partly sectioned detail of FIG. 1 showing a different operational position.
FIG. 5 is an elevation of a second embodiment.
FIG. 6 is a section on the line VI—VI in FIG. 4.
FIG. 7 is a section on the line VII—VII in FIG. 4.
FIG. 8 is a section on the line VIII—VIII in FIG. 4.
FIG. 9 is a section on the line IX—IX in FIG. 4.

Referring to FIGS. 1 to 4, the apparatus comprises a continuously rotatable input shaft 10 connected by means of a crank 11 and a connecting rod 12 to a slide 13 seated for reciprocating motion in guides 14, the crank 11 and rod 12 operating to convert continuous rotation of the shaft 10 into reciprocating motion of the slide 13. The shaft 10 and the guides 14 are supported on a frame 15.

Two drive sprockets 16, 17 are mounted for free rotation on pins 18 secured to the slide 13. An endless chain 19 is trained over the sprockets 16, 17 and extends therefrom in the shape of two loops 20, 21. The loop 20 is supported by two driven sprockets 22, 23 and comprises a run 24 between the sprockets 16, 22, a run 25 between the sprockets 22, 23, and a run 26 between the sprockets 23, 17. The loop 21 is supported by two driven sprockets 27, 28 and comprises a run 29 between the sprockets 16, 27, a run 30 between the sprockets 27, 28, and a run 31 between the sprockets 28, 17. The driven sprockets 22, 23 are positioned for the runs 24, 26 of the loop 20 to be parallel to the direction of movement of the slide 13, and the sprockets 27, 28 are positioned for the runs 29, 31 of the loop 21 to be parallel to the direction of movement of the slide 13. The sprockets 22, 27 are positioned for the runs 24, 29 to extend from the sprocket 16 to a position beyond that occupied by the latter when slide is at the top of its stroke to prevent fouling of the sprocket 16 with the sprockets 22, 27. The sprockets 23, 28 are correspondingly positioned for the runs 26, 31 to extend from the sprocket 17 to a position beyond that occupied by the latter sprocket when the slide 13 is at the bottom of its stroke. The sprockets 23, 28 are supported for rotation on pins 32 secured to the frame 15. The sprocket 22 is secured to a shaft 33 extending through the frame 15, and between the shaft 33 and the frame 15 there is provided a one-way detent 34 positioned to prevent rotation of the shaft 33 in the clockwise direction (FIG. 1).

The sprocket 27 is secured to a shaft 35 extending through the frame 15, and between the shaft 35 and the frame 15 there is provided a one-way detent 36 positioned to prevent rotation of the shaft 35 in the clockwise direction. In other words, the detent 34 prevents circulation of the loop 20 in a direction involving clock-wise rotation of the sprocket 22, the detent 36 prevents circulation of the loop 21 in a direction involving clock-wise rotation of the sprocket 27.

When the slide 13 is on the downward stroke (this being the condition illustrated) the sprocket 16 exerts a pull on the runs 24, 29 which pull tends to rotate the sprocket 22 in the anti-clockwise and the sprocket 27 in the clockwise direction. In view of the action of the detent 36 the run 29 resists this pull and the sprocket 16 is caused to rotate thereby moving the loop 20 at twice the speed of the slide 13 and rotating the shaft 33 in the anti-clockwise direction. During the upward stroke of the slide 13 these conditions are reversed in that a pull then exerted by the sprocket 17 on the runs 26, 31 tends to rotate the sprocket 22 in the clockwise and the sprocket 27 in the anti-clockwise direction whereby the shaft 33 is stopped and the shaft 35 is rotated in the anti-clockwise direction.

In this way the detents 34, 36 operate to lock the respective loops 20, 21 against travel alternately during the whole of the respective strokes of the slide 13, and the reciprocation of the slide 13 is converted into alternately occurring intermittent motion of the shafts 33, 35.

It will be seen that the chain 19 can be moved in a direction involving anti-clockwise rotation of the sprockets 22, 27 at all times, i.e., whether the slide 13 is moving or not, and the construction is limited to uses where this is desirable or, if not, where there is no possibility of the chain 19 being moved inadvertently in this way. However, where such inadvertent movement is produced by momentum during the deceleration phase of the slide 13, the difficulty is overcome as follows.

The slide 13 is provided at its upper end with an extension 37 including a stopping face 38. The shaft 33 has secured thereto a member 39 including an abutment face 40. The faces 38, 40 are so related that when the slide 13 is at the bottom of its stroke the face 40 abuts the face 38 and over-running of the chain, and thus of the shaft 33, is prevented. Rollers 41 provided on the frame 15 support the extension 37 under the impact of the member 39. The stroke of the slide 13 and the diameter of the sprocket 22 are so related that the sprocket 22 makes one revolution for the one stroke of the slide 13 during which the sprocket 22 is driven. FIG. 1 shows the slide 13 half-way along this stroke and the member 39 makes half a revolution from the position shown before engaging the extension 37. FIG. 4 shows the member 39 as engaged with the extension 37.

Both or either of the shafts 33, 35 may be used as output shafts of the apparatus depending on the use to which the apparatus is put. If only one of these shafts, say the shaft 33, is used as the output shaft, then the other shaft, 35, would be an idle shaft. Correspondingly, the loop 21 would be an idle loop, though still necessary for the function of the apparatus. The stopping means 37, 39 are shown as provided in respect of the loop 20, but corresponding means may be provided for the loop 21.

Referring now to FIGS. 5 to 9, these show apparatus similar to that shown in FIGS. 1 to 4 but have modified means for the alternate locking of the loops 20, 21 and modified means for countering momentum effects. The shaft 10 has secured thereto a member 50 provided with an arcuate lug 51. The sprockets 23 and 28 are positioned at diametrically opposite sides of the shaft 10 and have secured thereto discs 52 and 53 respectively. The discs 52, 53 are provided respectively with arcuate grooves 54, 55 dimensioned to receive the lug 51 as the latter rotates with the shaft 10. The discs 52, 53 are timed for the grooves 54, 55 to be concentric with the shaft 10 when the slide 13 is situated at the ends of its stroke, and the lug 51 is timed to pass from engagement with the groove 54 into engagement with the groove 55 when the slide 13 is at the top of its stroke (this being the position illustrated). Correspondingly, when the slide 13 is at the bottom of its stroke, the lug 51 passes from the groove 55 into the groove 54. The engagement between the lug 51 and the grooves 54, 55 operates to lock the respective loops 20, 21 alternately against rotation during the whole of the respective strokes of the slide 13.

However, in order to relieve the forces acting on the lug 51, the detents 34, 36 are still provided.

In the present example, only the shaft 33 is intended to be driven and the shaft 35 is dispensed with. Instead, the detent 36 is provided between the sprocket 27 and a sleeve 56 rotatably seated in the frame 15 and further supported by bracket 57. The sleeve 56 is connected to a clutch member 58 by means of pins 59 dimensioned to permit axial motion only of the member 58. The member 58 engages a clutch member 60 secured to the frame 15. The members 58, 60 are held in engagement against the pressure of a spring 61 by a bolt and nut respectively denoted 62, 63. Should it be required temporarily to move the shaft 10 backwards, i.e. in a direction normally blocked by the detents 34, 36, the nut 63 is released to effect disengagement of the clutch members, 58, 60. The shaft 10 can then be rotated backwards but it will be understood that such backward rotation is only possible during the part of the cycle of the apparatus when loop 20 is locked because otherwise the detent 34, which is not provided with a clutch, such as 58, 60, would resist backward turning of the shaft 10.

In order to ensure complete control over the shaft 33 during the period when it is about to stop and during the stopped position, there is secured to the shaft 33 a member 64 provided with an arcuate recess 65 dimensioned to be engaged by a half-round member 66 freely rotatable on a stub axle 67 secured to the frame 15. The member 66 is secured to a sprocket 68 connected by a chain 69 to a sprocket 70 integral with the crank 11. FIG. 4 shows the member 66 about to withdraw from engagement with the recess 65. After 180 degrees of rotation of the member 66, i.e. when the slide 13 is at the bottom of its stroke, an end portion 71 of the member 66 is situated in a position to be engaged by a portion 72 of the member 65 thereby preventing any over-run of the shaft 33, and thereafter the engagement between the members 64, 66 operates in conjunction with the detent 34 to keep the shaft 33 absolutely still until the illustrated position is reached again.

The cooperation of the members 64, 66 requires of course that the shaft 33 is always brought to rest in the same position. As in the example shown in FIGS. 1 to 4, so also in the present example, the stroke of the slide 13 and the diameter of the sprocket 22 are so related that the shaft 33 makes one revolution during the movement phase of its cycle, and the member 66 is accordingly driven to make half a revolution when disengaged from the member 64 during said revolution of the shaft 33.

The apparatus as illustrated in FIGS. 1 to 4 or 5 to 9 is applicable to the driving of a sheet feed conveyor used in conjunction with a press having a pair of platens for working on sheets, for instance, a cutting and creasing press. Such a coveyor and press are well understood in the art and are not illustrated, but it is stated that the shaft 10 is a shaft participating in reciprocating one of said platens and the shaft 33 is connected to drive the conveyor, the intermittent motion of the shaft 33 operating to impart to the conveyor the intermittent motion necessary for feeding sheets successively to the platen, stopping the sheets in a position between said platens for the sheets to be worked on, and subsequently removing the sheets from the platens.

What I claim and desire to secure by Letters Patent is:

1. Apparatus for converting reciprocating into intermittent motion comprising a reciprocable slide, a pair of drive sprockets mounted for free rotation on said slide, an endless chain trained over said sprockets, means for supporting said chain in a pair of loops each including a run extending from one of said drive sprockets towards a position beyond the position occupied by said one sprocket when the slide has reached one end of its stroke and a run extending from the other one of said drive sprockets towards a position beyond the position occupied by said other drive sprocket when the slide has reached the other end of its stroke, said supporting means being arranged for said runs of said loops to extend in a direction parallel to the direction of reciprocation of said slide, and locking means for locking said loops against travel alternately during the whole of the respective strokes of the slide, all whereby reciprocating movement of the slide is converted into intermittent movement of said loops.

2. Apparatus according to claim 1, said locking means comprising in respect of at least one of said loops a one-way detent connected between said one loop and a stationary part of the apparatus.

3. Apparatus according to claim 1, said locking means comprising in respect of at least one of the loops, means for locking said one loop against movement in both directions.

4. Apparatus according to claim 1, said drive sprockets being situated in positions spaced apart in the direction of movement of said slide.

5. Apparatus according to claim 1, said means for supporting said chain comprising in respect of each of said loops a pair of driven sprockets situated at the ends of the respective runs of said loop remote from the drive sprockets, said loop extending from one of said drive sprockets to one of said driven sprockets being the driven sprocket situated at the end of the run starting at said one of the drive sprockets, the loop passing over said one of the driven sprockets and thence over the other driven sprocket to the other one of the drive sprockets.

6. Apparatus according to claim 5, comprising at at least one sprocket of each of said pairs of driven sprockets a one-way detent co-operating to restrict rotation of said one sprocket to one direction only, the detents at the driven sprockets of the respective loops being arranged to restrict rotation of the driven sprockets of the respective loops to the same direction.

7. Apparatus according to claim 2, comprising means for arresting said at least one loop against movement in its direction of travel during the stationary period of the said one loop and at least at the time when said slide reaches the end of the stroke during which said one loop was moved.

8. Apparatus according to claim 7, said means for arresting said at least one loop comprising a sprocket rotatable by said one loop, a member connected to said sprocket and rotatable together therewith, said member and said slide being related to move towards each other and abut when said slide reaches the end of the stroke during which said one loop is moved.

9. Apparatus according to claim 1, comprising in respect of at least one of said loops a driven sprocket positioned to support one of said runs of said one loop at the end remote from the drive sprocket from which said one run extends, said driven sprocket being rotated by said one loop when the latter is moved, a one-way detent cooperating to restrict rotation of said driven sprocket to the direction determined by the movement of said one loop, a member connected to said driven sprocket and rotatable together therewith, an extension provided on said slide at the end thereof adjacent said driven sprocket, said member and said slide being dimensioned to abut when said slide reaches the end of the stroke during which said driven sprocket is rotated thereby stopping any further movement of said driven sprocket in said determined direction for so long as said member and said extension are in the abutting position.

10. Apparatus according to claim 1, wherein the locking means in respect of at least one of said loops comprise a first continuously rotatable member, a second member connected to said one loop to be rotated thereby, the members being disposed in juxtaposition and having parallel axes of rotation, the first member being provided with a first concentric arcuate portion, the second member being provided with a second arcuate portion having a radius substantially equal to that of the first arcuate portion and being positioned on said second member so that in one angular position thereof the centres of said arcuate portions coincide, the members being timed so that in said one angular position of the second member said first arcuate portion slidingly engages said second arcuate portion thereby to lock said second member and thus said one loop against movement while said first member rotates, disengagement of said arcuate portions by continued rotation of said first member again freeing said one loop for movement.

References Cited in the file of this patent

UNITED STATES PATENTS

| | | |
|---|---|---|
| 642,637 | Small | Feb. 6, 1900 |
| 645,364 | Kreson et al. | Mar. 13, 1900 |
| 1,083,402 | Hollen | Jan. 6, 1914 |